(12) United States Patent
Wienecke et al.

(10) Patent No.: US 10,982,686 B2
(45) Date of Patent: Apr. 20, 2021

(54) COOLANT PUMP ASSEMBLY

(71) Applicant: PIERBURG PUMP TECHNOLOGY GMBH, Neuss (DE)

(72) Inventors: Thomas Wienecke, Willich (DE); Elias-Immanuel Weirich, Aachen (DE); Stephan Schreckenberg, Pulheim-Stommeln (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 204 days.

(21) Appl. No.: 16/088,819

(22) PCT Filed: Apr. 1, 2016

(86) PCT No.: PCT/EP2016/057181
§ 371 (c)(1),
(2) Date: Sep. 27, 2018

(87) PCT Pub. No.: WO2017/167393
PCT Pub. Date: Oct. 5, 2017

(65) Prior Publication Data
US 2020/0300263 A1    Sep. 24, 2020

(51) Int. Cl.
*F04D 29/42* (2006.01)
*F04D 29/62* (2006.01)
*F01P 5/10* (2006.01)
*F04D 13/06* (2006.01)
*F04D 29/66* (2006.01)

(52) U.S. Cl.
CPC .......... *F04D 29/426* (2013.01); *F04D 29/628* (2013.01); *B60G 2204/20* (2013.01); *F01P 5/10* (2013.01); *F04D 13/06* (2013.01); *F04D 29/669* (2013.01)

(58) Field of Classification Search
CPC ........ F04D 29/60; F04D 29/605; F04D 29/628
See application file for complete search history.

(56) References Cited

U.S. PATENT DOCUMENTS

| | | | |
|---|---|---|---|
| 6,491,504 B2 * | 12/2002 | Nakagaki | F04D 29/605 248/638 |
| 2002/0015647 A1 | 2/2002 | Nakagaki et al. | |
| 2003/0062230 A1 | 4/2003 | Maeno et al. | |
| 2009/0302189 A1 * | 12/2009 | Tetsuda | F16F 1/3732 248/560 |

(Continued)

FOREIGN PATENT DOCUMENTS

| | | |
|---|---|---|
| JP | H02-141797 U | 11/1990 |
| JP | H07-326264 A | 12/1995 |

(Continued)

*Primary Examiner* — Patrick Hamo
(74) *Attorney, Agent, or Firm* — Norman B. Thot

(57) ABSTRACT

A coolant pump assembly includes an electric coolant pump for a motor vehicle. The electric coolant pump includes a multi-part pump housing and an electric drive unit arranged in the multi-part pump housing. The multi-pat housing includes a coolant inlet, a coolant outlet, and a fastening assembly via which the electric coolant pump is detachably connected in an engine compartment to an engine component and/or to a body part. The fastening assembly includes at least one screw connection and at least one interlocking connection.

8 Claims, 1 Drawing Sheet

(56) References Cited

U.S. PATENT DOCUMENTS

2010/0178183 A1* 7/2010 Kaufmann ............... F16F 15/08
                                                  417/472
2011/0123370 A1* 5/2011 Kim ..................... F04D 29/628
                                                  417/410.1
2013/0309084 A1   11/2013 Schreckenberg et al.

FOREIGN PATENT DOCUMENTS

| JP | 2001-304200 A | 10/2001 |
| JP | 2003-106370 A | 4/2003 |
| JP | 2008-121522 A | 5/2008 |
| JP | 2015-143494 A | 8/2015 |
| WO | WO 2012/084278 A1 | 6/2012 |
| WO | WO 2013/156515 A1 | 10/2013 |

* cited by examiner

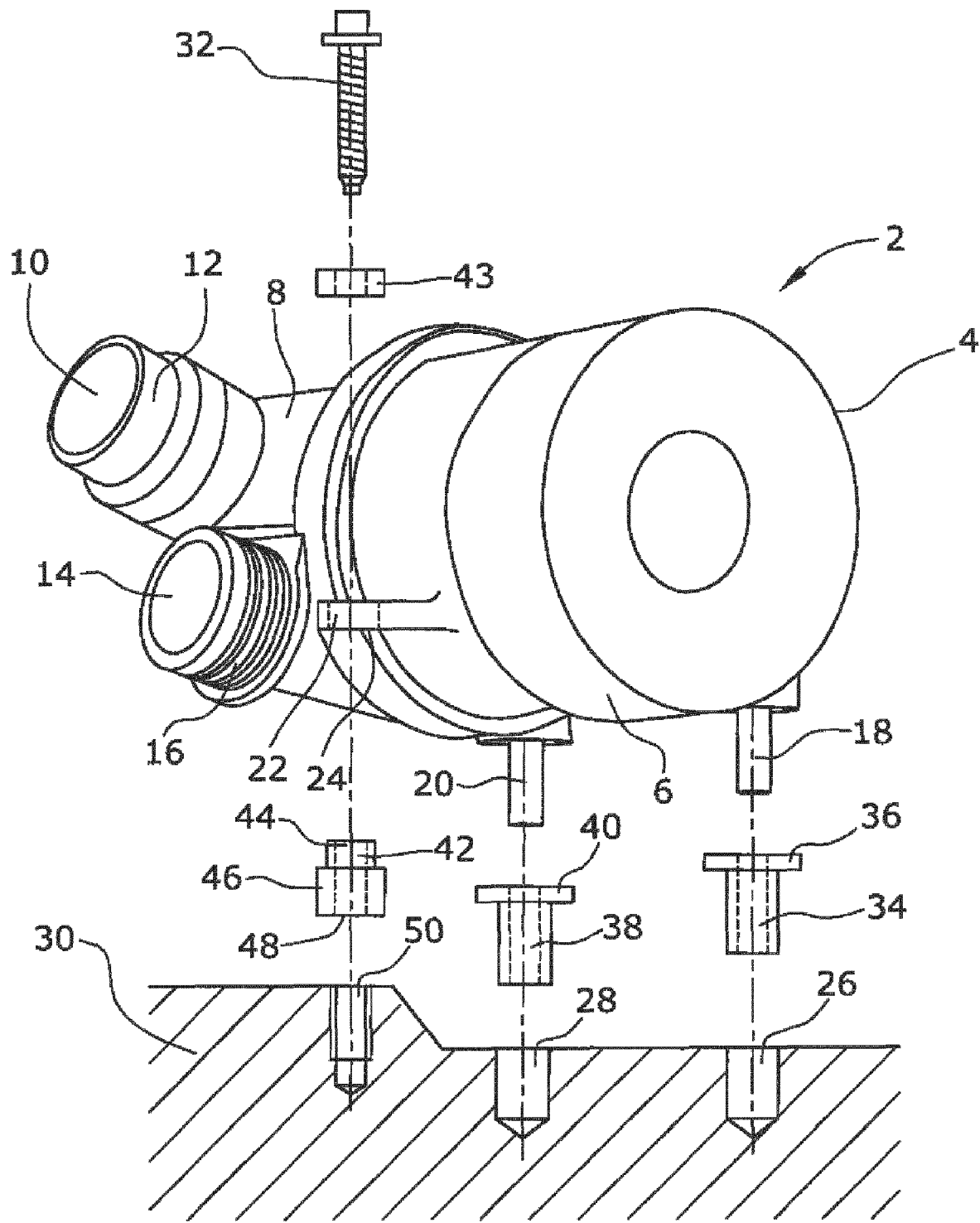

COOLANT PUMP ASSEMBLY

CROSS REFERENCE TO PRIOR APPLICATIONS

This application is a U.S. National Phase application under 35 U.S.C. § 371 of International Application No. PCT/EP2016/057181, filed on Apr. 1, 2016. The International Application was published in German on Oct. 5, 2017 as WO 2017/167393 A1 under PCT Article 21(2).

FIELD

The present invention relates to a coolant pump assembly having an electric coolant pump for a motor vehicle, the coolant pump assembly comprising a multi-part housing having a coolant inlet and a coolant outlet, wherein an electric drive unit is arranged in the housing and wherein the housing comprises a fastening assembly via which the coolant pump is adapted to be detachably connected in the engine compartment to an engine component and/or to a body part.

BACKGROUND

Such electric coolant pumps have previously been described and serve to provide an adequate engine cooling, in particular in combination with a heat management.

The coolant pump is usually arranged in the engine compartment and is fastened to an engine component or to a body via a plurality of screw connections. Such a coolant pump assembly is described, for example, in WO 2012/084278 A1. The coolant pump comprises a two-part housing wherein, in a first housing part, a coolant inlet as well as a coolant outlet are formed, and, in a second housing part, a drive unit is arranged together with the electronic system. The outside of the second housing part comprises a fastening assembly composed of a first radially extending portion and a second radially extending portion. The first and the second radially extending portions comprise, at the respective free ends thereof, through bore-holes through which screws, each with a damper, are inserted to fasten the coolant pump to an engine component or to a body, the screws being screwed into the engine component or into the body.

Many ancillary components besides the internal combustion engine are arranged in the engine compartment and because crash-relevant distances must be observed, very little space is available to mount the ancillary units and for the tools required therefor. The above-described coolant pump assembly is therefore disadvantageous in that several mounting steps are required at different places to fasten the coolant pump to an engine component or to the body.

SUMMARY

An aspect of the present invention is to provide a coolant pump assembly where the fastening of the coolant pump is facilitated.

In an embodiment, the present invention provides a coolant pump assembly which includes an electric coolant pump for a motor vehicle. The electric coolant pump comprises a multi-part pump housing and an electric drive unit arranged in the multi-part pump housing. The multi-pat housing comprises a coolant inlet, a coolant outlet, and a fastening assembly via which the electric coolant pump is configured to be detachably connected in an engine compartment to at least one of an engine component and to a body part. The fastening assembly comprises at least one screw connection and at least one interlocking connection.

BRIEF DESCRIPTION OF THE DRAWING

The present invention is described in greater detail below on the basis of embodiments and of the drawings in which:

The FIGURE shows an exploded view of an embodiment of a coolant pump assembly according to the present invention.

DETAILED DESCRIPTION

Due to the fact that the fastening assembly comprises at least one screw connection and at least one interlocking connection, a coolant pump assembly is created where the fastening of the coolant pump in the engine compartment to an engine component or the body is facilitated because a reduced number of screw connections is used and the space for tightening the screws in the engine compartment is thus not required. Due to the combination of interlocking and screw connections, fewer mounting steps for fastening the coolant pump are required since the interlocking connection blocks almost all possible movements of the coolant pump and the screw connection merely serves to secure the interlocking connection and/or to block the remaining directions of movement.

In an embodiment of the present invention, the at least one interlocking connection can, for example, be realized by a pin, wherein the pin engages with a bore in the engine component or in the body part. The at least one interlocking connection can alternatively be realized by a rib, wherein the rib engages with a recess in the engine component or in the body part. The pin or the rib is inserted into the bore by a simple translational displacement of the coolant pump and is secured by the screw connection. No additional manufacturing step is required to manufacture the pin or the rib since it is produced together with the housing in a single manufacturing step.

In an embodiment of the present invention, the at least one screw connection and the at least one interlocking connection can, for example, each comprise a damper so that vibrations between the coolant pump and an engine component or the body are absorbed and the resultant noises are reduced.

In an embodiment of the present invention, the damper can, for example, be made from an elastic plastic material so that the vibrations can be particularly well absorbed.

In an embodiment of the present invention, the damper can, for example, be configured as a sleeve having a collar portion, wherein the collar portion is formed at one end of the sleeve. All surfaces contacting each other between the coolant pump and an engine component or the body are thus separated from each other by the damper, and the transmission of vibrations is reduced.

In an embodiment of the present invention, the at least one screw connection and the at least one interlocking connection can, for example, be arranged in a common plane. The at least one screw connection and the at least one interlocking connection can alternatively be arranged in different planes.

In an embodiment of the present invention, the fastening assembly can, for example, comprise one screw connection and two interlocking connections. The interlocking connections prevent the rotational movements of the coolant pump and the screw connection prevents the translational movement of the coolant pump so that the coolant pump is fixedly arranged at an engine component or at the body. A screw must merely be screwed in by the workman in the case of such a coolant pump assembly. The time required to fasten the coolant pump to an engine component or to the body is also reduced.

In an embodiment of the present invention, the coolant pump can, for example, be a can pump so that an electric coolant pump has a compact configuration.

The FIGURE shows a coolant pump 2 for a motor vehicle. The coolant pump 2 serves to supply an internal combustion engine of a vehicle with a coolant. The coolant pump 2 comprises an essentially two-part pump housing 4 which is composed of a cylindrical first housing part 6 and a second housing part 8 mounted at the longitudinal end of the first housing part 6.

An electric drive unit including the electronic system of the engine is arranged (none of which are shown in the drawings) in the first housing part 6, wherein a can divides the interior of the pump housing 4 into a wet and a dry area. The stator of the drive unit and the electronic system of the engine are arranged in the dry area, while the rotor of the drive unit as well as the pump rotor are arranged in the wet area.

The second housing part 8 together with the first housing element 6 defines a pump chamber which comprises a coolant inlet 10 having an inlet branch 12 and a coolant outlet 14 having an outlet branch 16.

During operation, coolant flows into the pump chamber through the coolant inlet 10, is set in rotation by the pump rotor, and flows out through the coolant outlet 14.

The coolant pump 2 according to the present invention is fastened to an engine component 30, which is an oil sump 30 in the shown embodiment, or to a body via two interlocking connections 18, 26; 20, 28 and one screw connection 32, 50. For this purpose, the first housing part 6 comprises a first pin 18 engaging with a first bore 26 in the oil sump 30, a second pin 20 engaging with a second bore 28 in the oil sump 30, and a projection 22 having a through bore-hole 24 through which a screw 32 extends which is screwed into a bore 50 with an internal thread in the oil sump 30.

A first damper 34 is arranged radially between the enveloping surface of the first pin 18 and the enveloping surface of the first bore 26, the first damper 34 being configured as a sleeve and comprising a collar portion 36 at its end facing the coolant pump 2. In the mounted state, a circular ring-shaped base area of the collar portion 36 rests on the first housing part 6, and the opposite circular ring-shaped base area of the collar portion 36 rests on the oil sump 30. A second damper 38 is arranged in the same manner between the second pin 20 and the oil sump 30, the second damper 38 also being configured as a sleeve and comprising a collar portion 40.

A third damper 42 is arranged between the projection 22 and the oil sump 30, the third damper 42 comprising a through-going opening 48 through which the screw 32 is inserted. The third damper 42 comprises a first portion 44 which engages with the through bore-hole 24, and a second portion 46 which has a larger diameter than the through bore-hole 24 so that its shoulder rests on the projection 22 and its opposite end rests on the oil sump 30. An annular damping element 43 is moreover arranged between the projection 22 and the bearing surface of the screw head of the screw 32.

When the coolant pump 2 is mounted, for example, to the oil sump 30, the dampers 34, 38, 42 are first mounted to their respective places of the coolant pump 2. The first pin 18 and the second pin 20, together with the dampers 34, 38, are then inserted into the respective bores 26, 28 so that the interlocking connection is created. The last mounting step is the insertion of screw 32 through the third damper 42 and the screwing thereof into the bore 50.

The coolant pump assembly according to the present invention is thus characterized by a simple fastening of the coolant pump 2 to an engine component 30 or to the body.

It should be appreciated that other embodiments of the coolant pump assembly than the described embodiment are feasible without departing from the scope of protection of the present invention. The interlocking connections 18, 26; 20, 28, the screw connection 32, 50, or the dampers 34, 38, 42 may thus, for example, be of a different configuration. Reference should also be had to the appended claims.

What is claimed is:

1. A coolant pump assembly comprising an electric coolant pump for a motor vehicle, the electric coolant pump comprising:
   a multi-part pump housing comprising a coolant inlet, a coolant outlet and a fastening assembly via which the electric coolant pump is configured to be detachably connected in an engine compartment to at least one of an engine component and to a body part; and
   an electric drive unit arranged in the multi-part pump housing,
   wherein,
   the fastening assembly comprises at least one screw connection and at least one interlocking connection, and
   the at least one interlocking connection either comprises,
      a pin which is provided on the multi-part pump housing, the at least one interlocking connection being provided via the pin engaging with a bore in the engine component or in the body part, or
      a rib which is provided on the multi-part pump housing, the at least one interlocking connection being provided via the rib engaging with a recess in the engine component or in the body part.

2. The coolant pump assembly as recited in claim 1, wherein the at least one screw connection and the at least one interlocking connection each comprise a damper.

3. The coolant pump assembly as recited in claim 2, wherein each damper is made from an elastic plastic material.

4. The coolant pump assembly as recited in claim 2, wherein each damper is configured as a sleeve comprising a collar portion, the collar portion being formed at one end of the sleeve.

5. The coolant pump assembly as recited in claim 1, wherein the at least one screw connection and the at least one interlocking connection are arranged in a common plane.

6. The coolant pump assembly as recited in claim 1, wherein the at least one screw connection and the at least one interlocking connection are arranged in different planes.

7. The coolant pump assembly as recited in claim 1, wherein the fastening assembly comprises one screw connection and two interlocking connections.

8. The coolant pump assembly as recited in claim 1, wherein the coolant pump is a can pump.

* * * * *